US010677444B2

(12) United States Patent
Huang et al.

(10) Patent No.: US 10,677,444 B2
(45) Date of Patent: Jun. 9, 2020

(54) DOWNLIGHT FIXTURE

(71) Applicant: XIAMEN ECO LIGHTING CO. LTD., Xiamen (CN)

(72) Inventors: Zhenkun Huang, Xiamen (CN); Qiqing Yu, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 16/251,021

(22) Filed: Jan. 17, 2019

(65) Prior Publication Data

US 2019/0226671 A1 Jul. 25, 2019

(30) Foreign Application Priority Data

Jan. 19, 2018 (CN) .................... 2018 2 0090096 U

(51) Int. Cl.

| | |
|---|---|
| ***B60Q 1/06*** | (2006.01) |
| ***F21V 29/00*** | (2015.01) |
| ***F21V 29/74*** | (2015.01) |
| ***F21S 8/02*** | (2006.01) |
| ***F21V 23/06*** | (2006.01) |
| ***F21V 29/503*** | (2015.01) |
| ***F21V 23/00*** | (2015.01) |
| ***F21V 7/04*** | (2006.01) |
| ***F21V 15/01*** | (2006.01) |
| ***F21V 29/89*** | (2015.01) |
| *F21Y 115/10* | (2016.01) |

(52) U.S. Cl.

CPC ................ *F21V 29/74* (2015.01); *F21S 8/02* (2013.01); *F21S 8/026* (2013.01); *F21V 7/04* (2013.01); *F21V 15/01* (2013.01); *F21V 23/001* (2013.01); *F21V 23/06* (2013.01); *F21V 29/503* (2015.01); *F21V 29/89* (2015.01); *F21Y 2115/10* (2016.08)

(58) Field of Classification Search

CPC ........... F21S 8/00–088; F21V 7/04–30; F21V 15/00–015; F21V 23/00; F21V 23/001; F21V 23/06; F21V 29/503; F21V 29/70–74; F21V 29/85–90

USPC ... 362/147–160, 218, 249.02, 294, 364–366, 362/373

See application file for complete search history.

(56) References Cited

U.S. PATENT DOCUMENTS 8,894,254 B2 * 11/2014 Matsuda ................ F21S 8/026 362/249.02

* cited by examiner

*Primary Examiner* — Jason M Han

(74) *Attorney, Agent, or Firm* — Chun-Ming Shih; Lanway IPR Services

(57) ABSTRACT

A downlight fixture includes: a light source board arranged to emit optical light; an electrical connector electrically connected with the light source board for providing power to the light source board; a metallic cup shaped heat sink attached with the light source board; a plastic housing attached with the metallic cup shaped heat sink; and a heat sink, attached with the plastic housing. The metallic cup shaped heat sink, the plastic housing, and the heat sink are arranged to dissipate heat generated by the light source board.

18 Claims, 7 Drawing Sheets

DOWNLIGHT FIXTURE

FIELD

The present invention is related to a downlight apparatus and more particularly related to structures of a downlight apparatus.

BACKGROUND

In the field of downlight fixtures, the heat dissipating efficiency of a downlight fixture may affect the lifetime and illumination of the downlight fixture. Conventionally, a heat sink formed by metallic material may have better heat dissipating efficiency. A conventional way to improve the heat dissipating efficiency is to install a downlight fixture into a metallic housing. However, the cost of the metallic housing is relatively high. Therefore, another conventional way is to replace the metallic housing with a plastic housing, in which the cost of the plastic housing is relatively low. In comparison to the metallic housing, the heat dissipating efficiency of the plastic housing is relatively low. Therefore, a plastic housing may not meet the requirement of a downlight fixture having high heat dissipation during the operation.

SUMMARY OF INVENTION

Embodiments of the present invention include a downlight fixture. The downlight fixture includes a light source board, an electrical connector, a metallic cup shaped heat sink, a plastic housing, and a heat sink. The light source board is arranged to emit an optical light. The electrical connector is electrically connected with the light source board for providing power to the light source board. The metallic cup shaped heat sink is attached with the light source board. The plastic housing is attached with the metallic cup shaped heat sink. The heat sink is attached with the plastic housing. The metallic cup shaped heat sink, the plastic housing, and the heat sink are arranged to dissipate heat generated by the light source board.

In one embodiment of the downlight fixture, the metallic cup shaped heat sink is installed inside the plastic housing, the light source board is installed inside the metallic cup shaped heat sink, and the heat sink is installed outside the plastic housing.

In one embodiment of the downlight fixture, the plastic housing includes a cylindrical housing and a top plate. The top plate is formed on an end of the cylindrical housing. An outer surface of a top section of the metallic cup shaped heat sink is attached with an inner surface of the top plate, the light source board is attached with an inner surface of the metallic cup shaped heat sink, and the heat sink is directly connected with an outer surface of the top plate.

In one embodiment of the downlight fixture, the heat sink is a metallic heat sink attached with the top plate.

In one embodiment of the downlight fixture, the heat sink is a plastic heat sink integrated with the plastic housing.

In one embodiment of the downlight fixture, the heat sink includes a plurality of cooling fins connected with the top plate, and the plurality of cooling fins and the outer surface of the top plate form an angle of 30°~150°.

In one embodiment of the downlight fixture, the heat sink includes a first circular heat sink and a second circular heatsink. The first circular heat sink and the second circular heat sink are concentric, a first end of the plurality of cooling fins is connected with the first circular heat sink, and a second end of the plurality of cooling fins is connected with the second circular heat sink.

In one embodiment of the downlight fixture, the electrical connector includes a straight-cutting wire arranged to penetrate the plastic housing and the metallic cup shaped heat sink to connect with the light source board.

In one embodiment of the downlight fixture, a top plate jack is formed on the top plate of the plastic housing, a cup shaped heat sink jack is formed on the metallic cup shaped heat sink, a plug terminal is formed on the light source board, and the straight-cutting wire connects with the plug terminal by penetrating the top plate jack and the cup shaped heat sink jack.

In one embodiment of the downlight fixture, the straight-cutting wire includes a first straight section, a second straight section, and a bending section. The first straight section[[,]] is connected with the electrical connector. The second straight section is plugged into the light source board. The bending section is connected between the first straight section and the second straight section.

In one embodiment of the downlight fixture, the straight-cutting wire further includes a rigid cladding and a conductive wire. The conductive wire is disposed inside the rigid cladding. The plug terminal includes a hollow connecting column arranged to receive the second straight section of the straight-cutting wire. An end section of the rigid cladding reaches an end section of the hollow connecting column. The conductive wire plugs into the hollow connecting column and connects with circuits of the light source board.

In one embodiment of the downlight fixture, the downlight fixture further includes a reflective cup and a light-transmitting foam. The reflective cup is installed inside the metallic cup shaped heat sink for reflecting the optical light. The light-transmitting foam is installed on a rim of the reflective cup.

In one embodiment of the downlight fixture, the reflective cup includes a reflective surface, a light-entering opening, and a light-exiting opening. The reflective surface is configured to be a trumpet shape. The light-entering opening is formed in a first end of the reflective surface. The light-exiting opening is formed in a second end of the reflective surface. The light-entering opening abuts a surface of the light source board, a light emitting unit on the light source board is positioned on an area corresponding to the light-entering opening, the light-exiting opening and an edge of the light-transmitting foam are connected with the inner surface of the plastic housing, the light source board and the metallic cup shaped heat sink firmly connect with the top plate of the plastic housing via a connecting member.

In one embodiment of the downlight fixture, the plastic housing includes a housing edge and a mounting structure. The housing edge is formed by an eversion on an open end of the cylindrical housing. The mounting structure is installed on the housing edge. The downlight fixture further includes an elastic member arranged to connect with the mounting structure. The elastic member is a co-directional structure, and the elastic member is a symmetrical member.

In one embodiment of the downlight fixture, the elastic member is configured to be a "Z" shape, and the elastic member includes a connecting section and a mounting section. The mounting section is formed on a first end and a second end of the connecting section. The mounting structure includes a first limiting section, a second limiting section, a third limiting section, and a fourth limiting section. The first limiting section is connected with the housing edge for limiting a horizontal movement of the mounting section, the second limiting section is connected with the housing edge for limiting a vertical movement of the mounting section, and the third limiting section and the fourth limiting section connect with the first limiting section via a connecting arm for limiting a horizontal movement of the connecting section.

In one embodiment of the downlight fixture, the first limiting section includes a first stop plate and a second stop plate, the first stop plate and the second stop plate are located on opposite positions on the mounting structure, the mounting section plugs into a space between the first stop plate and the second stop plate. The second limiting section is disposed on an upper section between the first stop plate and the second stop plate for withstanding an end of the mounting section. The third limiting section includes a third stop plate and a fourth stop plate, the third stop plate and the fourth stop plate are located on opposite positions on the mounting structure, the fourth limiting section includes a fifth stop plate and a sixth stop plate, the fifth stop plate and the sixth stop plate are located on opposite positions on the mounting structure, one of the third stop plates and one of the fourth stop plates are orthogonally connected to form a first limiting slot, the other one of the third stop plates and the other one of the fourth stop plates are orthogonally connected to form a second limiting slot, and the connecting section plugs into a position between the first limiting slot and the second limiting slot.

Embodiments of the present invention include a downlight fixture. The downlight fixture includes a light source board, a metallic cup shaped heat sink, a plastic housing, and a straight-cutting wire. The light source board is arranged to emit optical light. The metallic cup shaped heat sink is attached with the light source board. The plastic housing is attached with the metallic cup shaped heat sink. The straight-cutting wire is arranged to penetrate the plastic housing and the metallic cup shaped heat sink to electrically connect with the light source board, for providing power to the light source board.

In one embodiment of the downlight fixture, a top plate jack is formed on a top plate of the plastic housing, a cup shaped heat sink jack is formed on the metallic cup shaped heat sink, a plug terminal is formed on the light source board, and the straight-cutting wire connects with the plug terminal by penetrating the top plate jack and the cup shaped heat sink jack.

In one embodiment of the downlight fixture, the straight-cutting wire includes a first straight section, a second straight section, and a bending section. The first straight section is arranged to receive the power. The second straight section is plugged into the plug terminal of the light source board. The bending section is connected between the first straight section and the second straight section. The bending section is arranged to induce an elastic force between the first straight section and the second straight section.

In one embodiment of the downlight fixture, the straight-cutting wire further includes a rigid cladding and a conductive wire. The conductive wire is disposed inside the rigid cladding. The plug terminal includes a hollow connecting column arranged to receive the second straight section of the straight-cutting wire, an end section of the rigid cladding reaches an end section of the hollow connecting column, the conductive wire plugs into the hollow connecting column and connects with circuits of the light source board.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
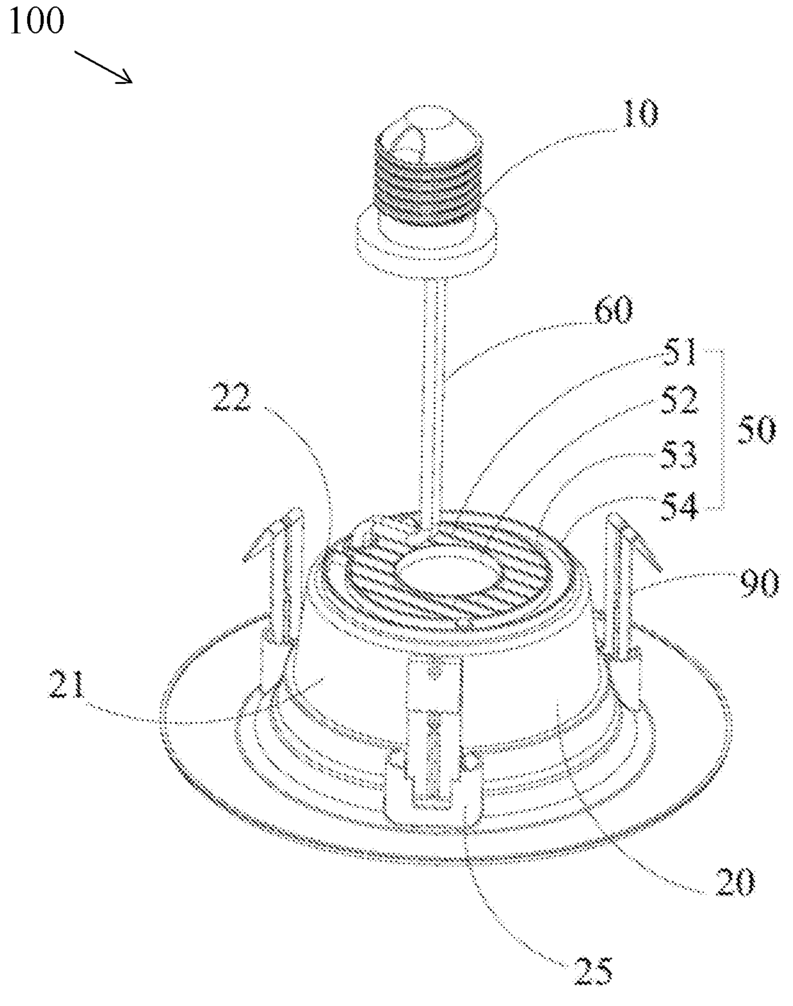
FIG. 1 is a diagram illustrating a downlight fixture in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term “about” generally means within 10%, 5%, 1%, or 0.5% of a given value or range. Alternatively, the term “about” means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one end point to another end point or between two end points. All ranges disclosed herein are inclusive of the end points, unless specified otherwise.

Figure 2:
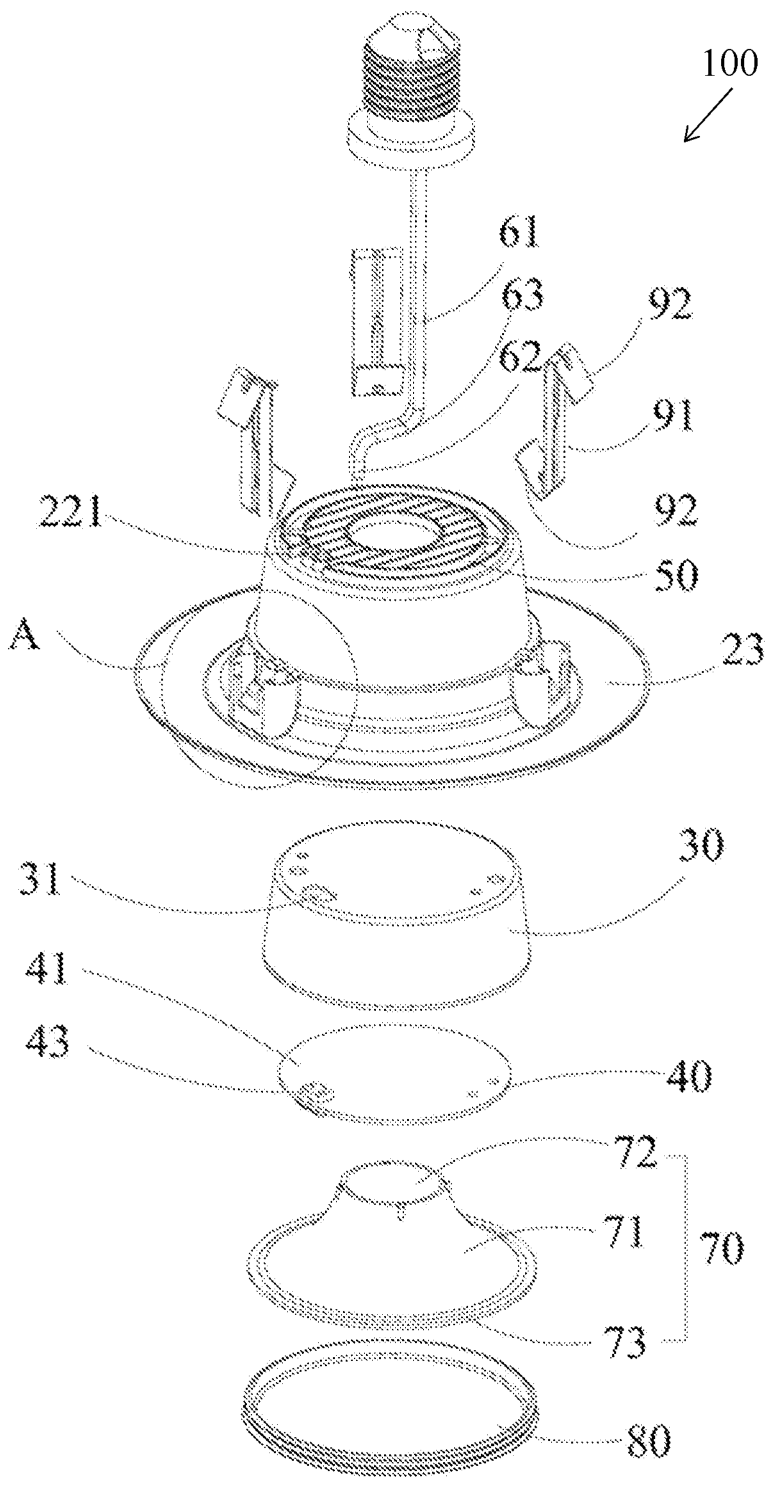
FIG. 2 is a diagram illustrating an exploded view of a downlight fixture in accordance with some embodiments.
Figure 3:
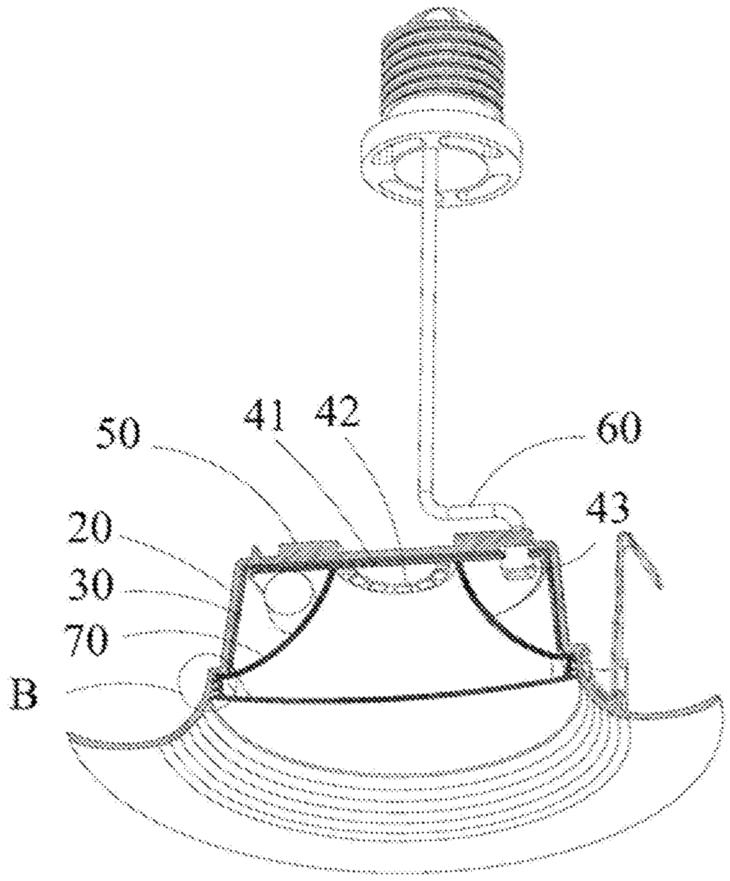
FIG. 3 is a diagram illustrating a cross-sectional view of a downlight fixture in accordance with some embodiments.
Figure 4:
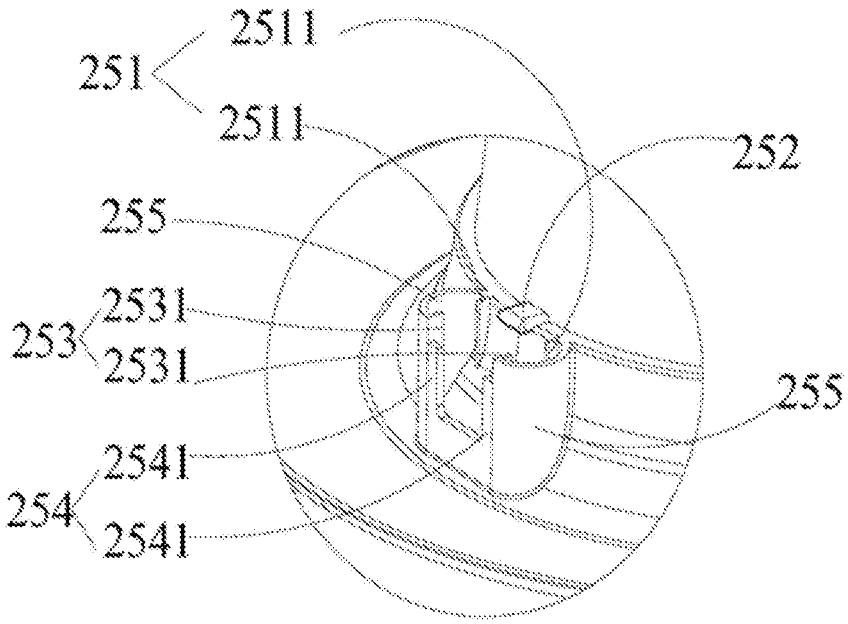
FIG. 4 is a diagram illustrating a mounting structure of a downlight fixture in accordance with some embodiments.
Figure 5:
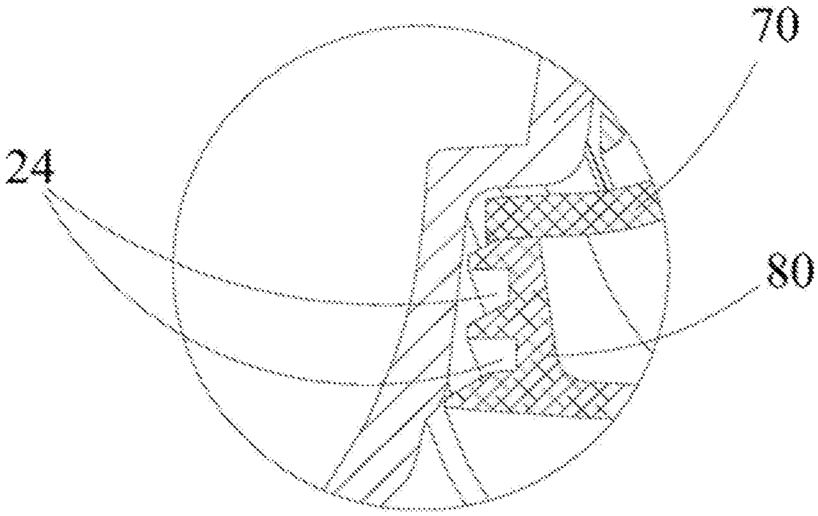
FIG. 5 is a diagram illustrating a cross-sectional view of a buckle of a downlight fixture in accordance with some embodiments.
Figure 6:
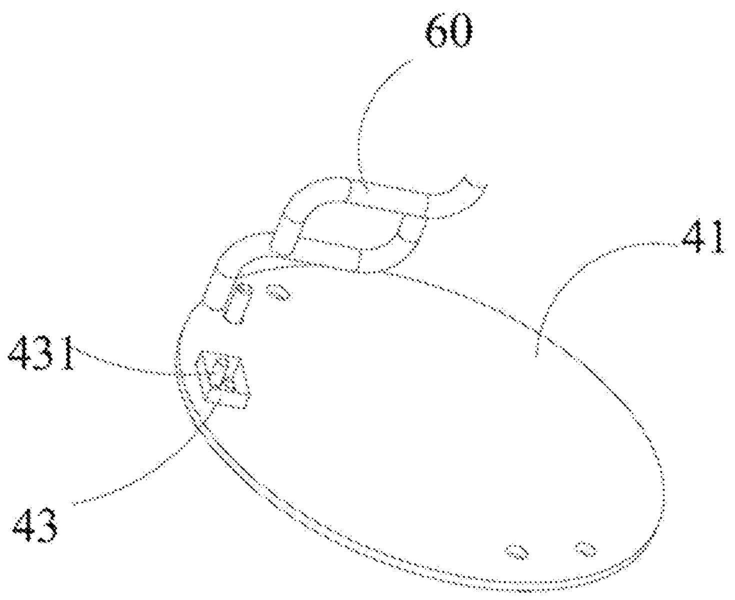
FIG. 6 is a diagram illustrating a light source board of a downlight fixture in accordance with some embodiments.
Figure 7:
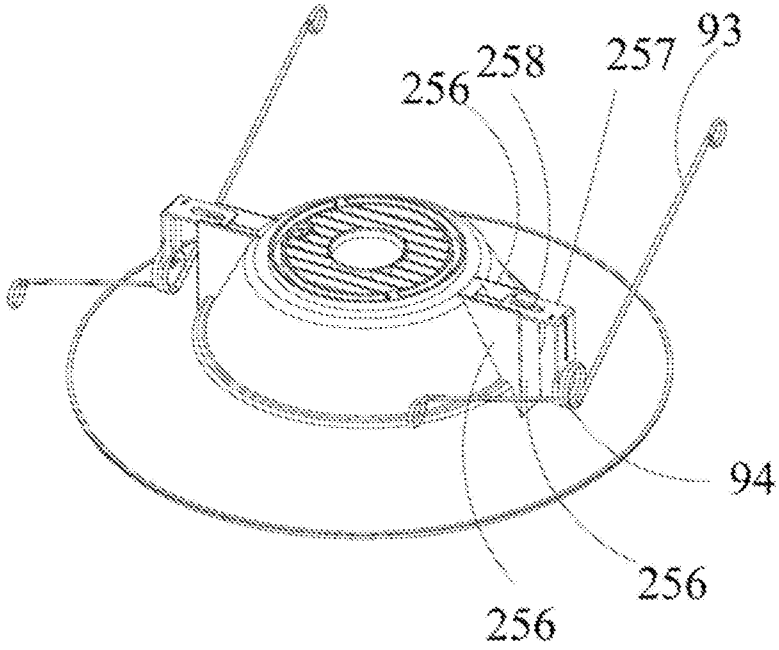
FIG. 7 is a diagram illustrating a mounting structure and an elastic member of a downlight fixture in accordance with some embodiments.

FIG. 1 is a diagram illustrating a downlight fixture 100 in accordance with some embodiments. FIG. 2 is a diagram illustrating an exploded view of the downlight fixture 100 in accordance with some embodiments. FIG. 3 is a diagram illustrating a cross-sectional view of the downlight fixture 100 in accordance with some embodiments. FIG. 4 is a diagram illustrating a mounting structure 25 (e.g. the portion A in FIG. 1) of the downlight fixture 100 in accordance with some embodiments. FIG. 5 is a diagram illustrating a cross-sectional view of a buckle 24 (e.g. the portion B in FIG. 3) of the downlight fixture 100 in accordance with some embodiments. FIG. 6 is a diagram illustrating a light source board 40 of the downlight fixture 100 in accordance with some embodiments. FIG. 7 is a diagram illustrating a mounting structure 25 and an elastic member 90 of a downlight fixture in accordance with some embodiments. The following paragraphs describe the detailed structure of the embodiments of the presented downlight fixture.

Please refer to FIG. 1 and FIG. 2, an embodiment of the downlight fixture 100 at least includes an electrical connector 10, a plastic housing 20, a metallic cup shaped heat sink 30, a light source board 40, and a heat sink 50. The metallic cup shaped heat sink 30 is installed inside the plastic housing 20. The light source board 40 is installed inside the metallic cup shaped heat sink 30. The light source board 40 is arranged to emit optical light. The heat sink 50 is an external heat sink installed outside the plastic housing 20. The electrical connector 10 is electrically connected to the light source board 40. The electrical connector 10 is installed outside the plastic housing 20. For example, the electrical connector 10 may be installed on the lamp head of the downlight fixture 100 or any other members on the downlight fixture 100 that capable of connecting the downlight fixture 100 to an external power supply. More specifically, the electrical connector 10 is electrically connected with a corresponding conductive wire, the conductive wire is electrically connected with the light source board 40 by penetrating the plastic housing 20 and the metallic cup shaped heat sink 30, in which the conductive wire is arranged to transmit power to the light source board 40 of the downlight fixture 100 such that the downlight fixture 100 is driven by the power to emit optical light. The plastic housing 20 includes cylindrical housing 21 and a top plate 22. The top plate 22 is installed on an end of the cylindrical housing 21. According to some embodiments, the top plate 22 is located on an opposite side of the open end of the cylindrical housing 21. The top plate 22 is integrated with the cylindrical housing 21. In other words, the top plate 22 and the cylindrical housing 21 are integrated to be one-piece device. In addition, the outer surface of a top section of the metallic cup shaped heat sink 30 is firmly attached with the inner surface of the top plate 22. The light source board 40 is firmly attached with the inner surface of the metallic cup shaped heat sink 30. The heat sink 50 is directly connected with the outer surface of the top plate 22. In other words, the outer surface of a top section of the metallic cup shaped heat sink 30 fits to the inner surface of the top plate 22. The heat sink 50 fits to the outer surface of the top plate 22. Accordingly, the light source board 40, the metallic cup shaped heat sink 30, the plastic housing 20, and the heat sink 50 are firmly attached with each other such that the contacting surfaces among the light source board 40, the metallic cup shaped heat sink 30, the plastic housing 20, and the heat sink 50 are relatively large. When the contacting surfaces among the light source board 40, the metallic cup shaped heat sink 30, the plastic housing 20, and the heat sink 50 increase, the heat dissipating efficiency of the downlight fixture 100 may be increased due to the shortening of the heat dissipating channel.

In an embodiment of the downlight fixture 100, the downlight fixture 100 is arranged to use the plastic housing 20 for reducing the cost. The inner surface of the top plate 22 of the plastic housing 20 attaches or fits with metallic cup shaped heat sink 30, the outer surface of the top plate 22 directly connects with the heat sink 50, the light source board 40 attaches or fits with the inner surface of the metallic cup shaped heat sink 30, the heat generated by the light source board 40 may be directly dissipated by the metallic cup shaped heat sink 30, the plastic housing 20, and the heat sink 50. Accordingly, the heat dissipating channel of the downlight fixture 100 may be reduced, the heat dissipating area of the downlight fixture 100 may be increased, and the heat dissipating efficiency of the downlight fixture 100 may be increased. When the heat dissipating efficiency of the downlight fixture 100 is improved, the lifetime and illumination of the downlight fixture 100 is also improved.

In an embodiment of the downlight fixture 100, the top plate 22 of the plastic housing 20 and the cylindrical housing 21 are integrated as a one-piece device. According to some embodiments, the top plate 22 may be a flat panel, and the cylindrical housing 21 may have the same or substantially the same thickness to the thickness of the top plate 22. The top plate 22 may be a round shape, the cylindrical housing 21 may have a consistent diameter or inconsistent diameter. The inconsistent diameter may be a gradually changing diameter. For example, when the diameter of the cylindrical housing 21 is consistent, the cylindrical housing 21 may be a straight cylindrical housing. When the diameter of the cylindrical housing 21 is inconsistent, the cylindrical housing 21 may be a truncated conical housing. For the truncated conical housing, the open end with a relatively small diameter is connected with the top plate 22, and the open end with a relatively large diameter is everted and extended to form an eversion on the housing edge 23.

Please refer to FIG. 2 and FIG. 3 again, the shape of the metallic cup shaped heat sink 30 may be designed to match the shape of the inner surface of the plastic housing 20 such that the metallic cup shaped heat sink 30 may firmly attach or fit with the inner surface of the plastic housing 20. When the metallic cup shaped heat sink 30 is firmly attached with the inner surface of the plastic housing 20, the heat dissipating efficiency of the downlight fixture 100 is increased as the contacting surface between the metallic cup shaped heat sink 30 and the inner surface of the plastic housing 20 is increased. In addition, when the shape of the metallic cup shaped heat sink 30 matches the shape of the inner surface of the plastic housing 20, the metallic cup shaped heat sink 30 is more easily to mount on the plastic housing 20.

Please refer to FIG. 2 and FIG. 3 again, the light source board 40 includes a board 41 and a light emitting unit 42. The shape of the board 41 matches the shape of the top section of the metallic cup shaped heat sink 30. The light emitting unit 42 is disposed on the center of the inner surface of the board 41. In one embodiment, the light emitting unit 42 may be implemented by LED (Light-emitting diode) elements. The board 41 is attached or fitted with the inner surface of the top section of the metallic cup shaped heat sink 30. At least one connecting member (e.g. at least one screw) may be used to firmly connect (or to screw) the board 41, the metallic cup shaped heat sink 30, and the top plate 22 of the plastic housing 20.

According to some embodiments, the heat sink 50 may be integrated with the plastic housing 20 to form a one-piece device. For example, the heat sink 50 and the plastic housing 20 are composed of plastic material. In addition, the heat sink 50 includes a plurality of cooling fins 51. The plurality of cooling fins 51 are connected with the top plate 22. An angle is formed between the plurality of cooling fins 51 and the outer surface of the top plate 22. According to some embodiments, the angle may be 30°~150°. In other words, the cooling fins 51 is not parallel to the top plate 22. Instead, a specific angle is formed between the cooling fins 51 and the top plate 22. The specific angle may be 90° or approximately 90°. The cooling fins 51 may orthogonally or vertically connect with the top plate 22. Accordingly, the heat dissipating efficiency of the downlight fixture 100 is improved. Moreover, when the heat sink 50 is integrated with the plastic housing 20, the cost of the downlight fixture 100 is reduced, and the installation of the downlight fixture 100 is simplified.

According to some embodiments, the heat sink 50 may be a metallic heat sink attached or fit with the top plate 22. When the heat sink 50 is a metallic heat sink, the heat sink 50 may be a discrete device installed on the top plate 22. Although the heat sink 50 (i.e. the metallic heat sink) is not integrated with the top plate 22, the heat sink 50 (i.e. the metallic heat sink) may still have good heat dissipating efficiency due to the high heat dissipating efficiency, in comparison with the plastic heat sink, of the metallic heat sink. Moreover, the cost of the metallic heat sink is higher than the cost of the plastic heat sink. However, the cost of using the plastic housing 20 in combination with the metallic heat sink is still lower than the cost of the conventional counterpart using the metallic housing.

According to some embodiments, the plurality of cooling fins 51 of the heat sink 50 may parallel with each other. According to some embodiments, the plurality of cooling fins 51 may be arranged as a grid form or radiating form as shown in FIG. 1. The plurality of cooling fins 51 may also be separated into two group of cooling fins, in which one group of cooling fins is symmetric to the other group of cooling fins. More specifically, the height of the plurality of the cooling fins 51 may be in a range of 0.5~15 mm. In one embodiment, the height of the plurality of the cooling fins 51 may be in a range of 1~10 mm. For example, the height of the plurality of the cooling fins 51 is 3 mm. The thickness of a cooling fin 51 may be in a range of 0.5~3 mm. For example, the thickness of a cooling fin 51 is 1 mm. The gap between two cooling fins 51 may be around 2~10 mm. For example, the gap between two cooling fins 51 is 4 mm. The design of the plurality of cooling fins 51 is corresponded to the panel shape of the heat sink 50, and the heat dissipating area may increase 50%~500%. When the heat sink 50 is formed by the above mentioned parameters, the heat dissipating area of the heat sink 50 may increase about 100%.

In addition, the heat sink 50 further includes a first circular heat sink 52 and a second circular heat sink 53, the first circular heat sink 52 and the second circular heat sink 53 are concentric circular heat sinks. The first end(s) of the plurality of cooling fins 51 is connected with the first circular heat sink 52, and the second end(s) of the plurality of cooling fins 51 is connected with the second circular heat sink 53. The first circular heat sink 52 and the second circular heat sink 53 are extended upward from the top plate 22. The first circular heat sink 52 and the second circular heat sink 53 may be integrated with the top plate 22. The inner side of the first circular heat sink 52 is an empty space. The outer side of the second circular heat sink 53 may be installed with a third circular heat sink 54. The first circular heat sink 52, the second circular heat sink 53, and the third circular heat sink 54 are concentric circular heat sink. The area between the second circular heat sink 53 and the third circular heat sink 54 is an empty area. At least one hole may be formed on the top plate 22 between the second circular heat sink 53 and the third circular heat sink 54. The hole may be penetrated by a conductive wire for connecting the electrical connector 10 and the light source board 40. The hole may close to the edge of the top plate 22 of the plastic housing 20. When the hole is formed on the edge of the top plate 22, the conductive wire of the light source board 40 may not interfere with the conductive wire of the light emitting unit 42 or other devices on the light source board 40.

According to some embodiments, the connection between the electrical connector 10 and the light source board 40 is described in the following paragraphs:

Please refer to FIG. 2 and FIG. 6, the electrical connector 10 is connected to the straight-cutting wire 60, and the straight-cutting wire 60 is a rigid or inflexible straight-cutting wire. The top plate jack 221, i.e. the above mentioned hole, is arranged to form on the top plate 22 of the plastic housing 20. The cup shaped heat sink jack 31 is formed on the metallic cup shaped heat sink 30. The plug terminal 43 or socket is formed on the light source board 40. The straight-cutting wire 60 penetrates the top panel jack 221 and the cup shaped heat sink jack 31 to connect with the plug terminal 43. The plug terminal 43 is formed on the light source board 40. The plug terminal 43 includes two conductive connecting columns 431. The conductive connecting columns 431 are arranged to directly or indirectly connect with the circuits on the light source board 40. The straight-cutting wire 60 is connected with the connecting columns 431. In other words, the straight-cutting wire 60 is electrically connected with the light source board 40.

According to some embodiments, the straight-cutting wire 60 includes a rigid cladding and a conductive wire. The conductive wire is disposed inside the rigid cladding. As the straight-cutting wire 60 is rigid cladded, the straight-cutting wire 60 may be inflexible and strong enough to maintain as a straight line during the installation of the downlight fixture 100. During the installation, a user may hold the electrical connector 10 to directly penetrate an end of the straight-cutting wire 60 through the top plate jack 221 and the cup shaped heat sink jack 31 to connect with the plug terminal 43. When the end of the straight-cutting wire 60 connects with the plug terminal 43, the end section of the rigid cladding reaches and contacts with the end section of the connecting column 431. The conductive line protruded from the end section of the rigid cladding is plugged into the connecting column 431 to electrically connect with the circuits on the light source board 40.

In addition, as shown in FIG. 2, the straight-cutting wire 60 may comprise include a bending section. More specifically, the straight-cutting wire 60 includes a first straight section 61, a second straight section 62, and a bending section 63. The first straight section 61 is connected with the electrical connector 10. The second straight section 62 is plugged into the light source board 40. The bending section 63 is connected between the first straight section 61 and the second straight section 62. Due to the bending section 63, the straight-cutting wire 60 may not straightly connect between the electrical connector 10 and the light source board 40. In other words, the straight-cutting wire 60 is not a straight wire connected between the electrical connector 10 and the light source board 40. Instead, a bending section (i.e. 63) is coupled between the electrical connector 10 and the light source board 40 such that an elastic force may be induced between the electrical connector 10 and the light source board 40. The bending section 63 may parallel to the surface of the top plate of the plastic housing 20. Accordingly, a buffering effect may be induced between the electrical connector 10 and the light source board 40 when the straight-cutting wire 60 is plugged into the light source board 40. This buffering effect may assure the straight-cutting wire 60 to lightly contact with the light source board 40 during the plug-in operation, and may protect the light source board 40 from being damaged by the straight-cutting wire 60 during the plug-in operation.

According to some embodiments, the straight-cutting wire 60 may replace the conventional connection terminal (e.g. a conventional ideal terminal strip) of a downlight fixture. When a downlight fixture applies the conventional connection terminal, the male terminal and the female terminal of the conventional connection terminal are manually plugged by a user, and this may decrease the efficiency and increase the cost of device installation. Moreover, the yield rate of the conventional downlight fixture may not be controlled easily. When the lighting test is performed upon the conventional downlight fixtures, the male terminal and the female terminal of the conventional connection terminals are manually connected by operators or workers. In addition, the conductive line of the conventional connection terminal is manually welded to the light source board of the conventional downlight fixture for transmitting power to the conventional downlight fixture. Therefore, the cost and the yield rate of the conventional downlight fixture may be worsen. On the contrary, by applying the presented straight-cutting wire 60 into a downlight fixture, the cost and yield rate problems caused by the conventional connection terminal may be mitigated.

Please refer to FIG. 2 to FIG. 4, the downlight fixture 100 further includes a reflective cup 70 and a light-transmitting foam 80. The reflective cup 70 is installed inside the metallic cup shaped heat sink 30. The light-transmitting foam 80 is installed on a rim of the reflective cup 70. The reflective cup 70 includes a reflective surface 71, a light-entering opening 72, and a light-exiting opening 73. The reflective surface 71 is configured to be a trumpet shape. The light-entering opening 72 is formed in a first end of the reflective surface 71. The light-exiting opening 73 is formed in a second end of the reflective surface 71. The light-entering opening 72 abuts a surface of the light source board 40. The light emitting unit 42 on the light source board 40 is right positioned on an area corresponding to the light-entering opening 72. The light-exiting opening 73 of the reflective cup 70 and an edge of the light-transmitting foam 80 are connected with the inner surface of the plastic housing 20. The light source board 40 and the metallic cup shaped heat sink 30 firmly connect with the top plate of the plastic housing 20 via a connecting member. According to some embodiments, a buckle 24 may be formed on the inner surface of the plastic housing 20. A connecting structure matched the buckle 24 may be formed on the edge of the light-exiting opening 73 of the reflective cup 70 and the edge of the light-transmitting foam 80. For example, the buckle 24 or the connecting structure may be formed as an annular flange, annular groove, or annular with distributed flanges and grooves. More specifically, the light-exiting opening 73 of the reflective cup 70 may upwardly evert to wrap the edge of the metallic cup shaped heat sink 30 such that the reflective cup 70, the metallic cup shaped heat sink 30, and the plastic housing 20 may contact with each other more closely.

Please refer to FIG. 2 again, the downlight fixture 100 may be installed on ceiling, wall, or other supporting surface through an elastic member. According to some embodiments, the plastic housing 20 further includes a housing edge 23 and a mounting structure 25. The housing edge 23 is formed by an eversion on an open end of the cylindrical housing 21. The mounting structure 25 is installed on the housing edge 23. The downlight fixture 100 further includes an elastic member 90 arranged to connect with the mounting structure 25. According to some embodiments, the elastic member 90 is a co-directional structure, and the elastic member 90 is a symmetrical member with respect to a center of the elastic member 90. More specifically, the elastic member 90 includes two symmetrical mounting sections. During the installation of the downlight fixture 100, the direction of the symmetrical mounting sections may not affect the installation. In other words, for an elastic member 90, any one of the symmetrical mounting sections may be plugged into the mounting structure 25 of the housing edge 23. Therefore, the elastic member 90 may ease the installation of the downlight fixture 100 on ceiling, wall, or other supporting surface.

Please refer to FIG. 2 and FIG. 5 again, the elastic member 90 is configured to be a "Z" shape. According to some embodiments, the elastic member 90 includes a connecting section 91 and a mounting section 92. The mounting section 92 is formed on a first end and a second end of the connecting section 91. The mounting structure 25 on the housing edge 23 includes a first limiting section 251, a second limiting section 252, a third limiting section 253, and a fourth limiting section 254. The first limiting section 251 is connected with the housing edge 23 for limiting a horizontal movement of the mounting section 92. The second limiting section 252 is connected with the housing edge 23 for limiting a vertical movement of the mounting section 92, the third limiting section 253 and the fourth limiting section 254 connect with the first limiting section 251 via a connecting arm for limiting a horizontal movement of the connecting section 91. According to some embodiments, the first limiting section 251 includes two stop plates 2511, the two stop plates 2511 are located on opposite positions on the mounting structure 25, and the mounting section 92 plugs into a space between the two stop plates 2511. The second limiting section 252 is connected with the housing edge 23. The second limiting section 252 is disposed on an upper section between the two stop plates 2511 for withstanding an end of the mounting section 92. The third limiting section 253 includes two stop plates 2531, and the two stop plates 2531 are located on opposite positions on the mounting structure 25. The fourth limiting section 254 includes two stop plates 2541, and the two stop plates 2541 are located on opposite positions on the mounting structure 25. A plate is formed between the two stop plates 2541 for connecting the two stop plates 2541. According to some embodiments, one of the two stop plates 2531 and one of the two stop plates 2541 are orthogonally connected to form a limiting slot (i.e. the first limiting slot). The other one of the two stop plates 2531 and the other one of the two stop plates 2541 are orthogonally connected to form another limiting slot (i.e. the second limiting slot). The first limiting slot corresponds to the second limiting slot. The connecting section 91 plugs into a space between the two limiting slots. In addition, one of the two stop plates 2511 is connected with one end of an arc shaped connecting arm 255, and the other end of the arc shaped connecting arm 255 is connected with one of the two stop plates 2531 and one of the two stop plates 2541. The other one of the two stop plates 2511 is connected with the other arc shaped connecting arm 255. The other end of the other arc shaped connecting arm 255 is connected with the other one of the two stop plates 2531 and the other one of the two stop plates 2511. The whole mounting structure 25 and the plastic housing 20 are integrated as a one-piece device. One of the mounting sections 92 and a portion of the corresponding connecting section 91 of one of the elastic members 90 is plugged into the mounting structure 25. Moreover, the mounting section 92 is limited by the two stop plates 2511 and the second limiting section 252. The two stop plates 2511 are arranged to limit the horizontal movement of the mounting section 92. The second limiting section 252 is arranged to limit the vertical movement of the mounting section 92. The connecting section 91 is limited by two limiting grooves. The other mounting section 92 of an elastic member 90 is protruded from the mounting structure 25 for x hooking or mounting the downlight fixture 100 to a connecting member of a supporting wall.

According to some embodiments, the mounting structure 25 and the elastic member 90 may be implemented as the structure in FIG. 7. In this embodiment, the mounting structure 25 is disposed on the outer surface of the plastic housing 20. More specifically, the mounting structure 25 includes three plates 256, wherein two of the plates 256 are parallel with each other and the sides of the two plates 256 are connected with the outer surface of the plastic housing 20, and one of the plates 256 having two sides connected with the two plates 256 respectively. The bottom of the mounting structure 25 is connected with the surface of the plastic housing 20. The three plates 256 are surrounded to form a grooved space having an opening on top. At least one mounting hole is formed inside the grooved space. The elastic member 90 includes two supporting arms 93 and a spring 94. The spring 94 is connected between the two supporting arms 93. The elastic member 90 is formed as "V" shape. The elastic member 90 is connected with the mounting structure 25 through a connecting piece 257, and the connecting piece 257 is formed as "L" shape. One end of the connecting piece 257 is plugged into the spring 94, and other end of the connecting piece 257 is configured to have a hole 258. The hole 258 overlaps with the mounting hole on the mounting structure 25, and a screw or any connecting devices may be used to connect the connecting piece 257 and the mounting structure 25. During the installation of the downlight fixture 100, the two supporting arms 93 may be pressed and mounted into the mounting board. Then, the two supporting arms 93 may spring back and buckle the downlight fixture 100 on the mounting board.

According to the embodiments of presented downlight fixture 100, the downlight fixture may have the following advantages:

1) According to the downlight fixture 100, the light source board 40, the metallic cup shaped heat sink 30, and the plastic housing 20 are attached with each other layer by layer, and the heat sink 50 and the plastic housing 20 are integrated as a one-piece device. Accordingly, the heat dissipating efficiency of the plastic housing 20 is increased due to the increasing the heat dissipating area and the decreasing of the heat dissipating channel. Moreover, the cost is also reduced by using the plastic housing 20.

2) According to the downlight fixture 100, the electrical connector 10 is connected with the straight-cutting wire 60, and the plug terminal 43 is disposed on the light source board 40. The conventional connection terminal (e.g. IDEAL terminal strip) may be omitted in the downlight fixture. The straight-cutting wire 60 may be directly plugged into the plug terminal 43 to electrically connect the electrical connector 10 and the light source board 40. Therefore, the present invention may speed up the installation, the testing, and the productivity of the downlight fixture.

3) According to the downlight fixture 100, the elastic member 90 is a co-directional structure, and the elastic member 90 may plug into the mounting structure 25 irrespective of the direction of the elastic member 90. Therefore, the downlight fixture may be installed by automated equipment, and the installing efficiency of the downlight fixture may be increased.

According to some embodiments, the downlight fixture 100 may be designed to have various specifications or sizes. For example, the size of the downlight fixture 100 may be 4 Inches and/or 5-6 Inches. When the size of the downlight fixture is 4 Inches, three mounting structures 25 are formed on the side of the plastic housings 20. Three elastic members 90 may be directly plugged into the mounting structures 25 respectively. When the size of the downlight fixture 100 is 5-6 Inches, two elastic members 90 are employed to mount with the plastic housing 20 as shown in FIG. 7. In comparison to the downlight fixture 100 of 4 Inches, the downlight fixture 100 of 5-6 Inches has different mounting structure 25.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A downlight fixture, comprising:

a light source board, arranged to emit optical light;

an electrical connector, electrically connected with the light source board, for providing power to the light source board;

a metallic cup shaped heat sink, attached with the light source board;

a plastic housing, attached with the metallic cup shaped heat sink;

a heat sink, attached with the plastic housing;

a reflective cup, installed inside the metallic cup shaped heat sink, for reflecting the optical light; and a light-transmitting foam, installed on a rim of the reflective cup, wherein the metallic cup shaped heat sink, the plastic housing, and the heat sink are arranged to dissipate heat generated by the light source board.

2. The downlight fixture of claim 1, wherein the metallic cup shaped heat sink is installed inside the plastic housing, the light source board is installed inside the metallic cup shaped heat sink, and the heat sink is installed outside the plastic housing.

3. The downlight fixture of claim 1, wherein the plastic housing comprises:

a cylindrical housing; and a top plate, formed on an end of the cylindrical housing;

wherein an outer surface of a top section of the metallic cup shaped heat sink is attached with an inner surface of the top plate, the light source board is attached with an inner surface of the metallic cup shaped heat sink, and the heat sink is directly connected with an outer surface of the top plate.

4. The downlight fixture of claim 3, wherein the heat sink is a metallic heat sink attached with the top plate.

5. The downlight fixture of claim 3, wherein the heat sink is a plastic heat sink integrated with the plastic housing.

6. The downlight fixture of claim 3, wherein the heat sink comprises a plurality of cooling fins connected with the top plate, and the plurality of cooling fins and the outer surface of the top plate form an angle of 30°~150°.

7. The downlight fixture of claim 6, wherein the heat sink comprises a first circular heat sink and a second circular heat sink, the first circular heat sink and the second circular heat sink are concentric, a first end of the plurality of cooling fins is connected with the first circular heat sink, and a second end of the plurality of cooling fins is connected with the second circular heat sink.

8. The downlight fixture of claim 1, wherein the electrical connector comprises:

a straight-cutting wire, arranged to penetrate the plastic housing and the metallic cup shaped heat sink to connect with the light source board.

9. The downlight fixture of claim 8, wherein a top plate jack is formed on a top plate of the plastic housing, a cup shaped heat sink jack is formed on the metallic cup shaped heat sink, a plug terminal is formed on the light source board, and the straight-cutting wire connects with the plug terminal by penetrating the top plate jack and the cup shaped heat sink jack.

10. The downlight fixture of claim 9, wherein the straight-cutting wire comprises:

a first straight section, connected with the electrical connector;

a second straight section, plugged into the light source board; and a bending section, connected between the first straight section and the second straight section.

11. The downlight fixture of claim 10, wherein straight-cutting wire further comprises:

a rigid cladding; and a conductive wire, disposed inside the rigid cladding;

wherein the plug terminal comprises a hollow connecting column arranged to receive the second straight section of the straight-cutting wire, an end section of the rigid cladding reaches an end section of the hollow connecting column, the conductive wire plugs into the hollow connecting column and connects with circuits of the light source board.

12. The downlight fixture of claim 1, wherein the reflective cup comprises:

a reflective surface, configured to be a trumpet shape;

a light-entering opening, formed in a first end of the reflective surface; and a light-exiting opening, formed in a second end of the reflective surface;

wherein the light-entering opening abuts a surface of the light source board, a light emitting unit on the light source board is positioned on an area corresponding to the light-entering opening, the light-exiting opening and an edge of the light-transmitting foam are connected with the inner surface of the plastic housing, the light source board and the metallic cup shaped heat sink firmly connect with the top plate of the plastic housing via a connecting member.

13. The downlight fixture of claim 1, wherein the plastic housing comprises:

a housing edge, formed by an eversion on an open end of a cylindrical housing of the plastic housing; and a mounting structure, installed on the housing edge;

the downlight fixture further comprises:

an elastic member, arranged to connect with the mounting structure;

wherein the elastic member is a co-directional structure, and the elastic member is a symmetrical member.

14. The downlight fixture of claim 13, wherein the elastic member is configured to be a "Z" shape, and the elastic member comprises:

a connecting section; and a mounting section, formed on a first end and a second end of the connecting section; and the mounting structure comprises a first limiting section, a second limiting section, a third limiting section, and a fourth limiting section, wherein the first limiting section is connected with the housing edge for limiting a horizontal movement of the mounting section, the second limiting section is connected with the housing edge for limiting a vertical movement of the mounting section, the third limiting section and the fourth limiting section connect with the first limiting section via a connecting arm for limiting a horizontal movement of the connecting section.

15. The downlight fixture of claim 14, wherein the first limiting section comprises a first stop plate and a second stop plate, the first stop plate and the second stop plate are located on opposite positions on the mounting structure, the mounting section plugs into a space between the first stop plate and the second stop plate;

the second limiting section is disposed on an upper section between the first stop plate and the second stop plate for withstanding an end of the mounting section;

the third limiting section comprises a third stop plate and a fourth stop plate, the third stop plate and the fourth stop plate are located on opposite positions on the mounting structure, the fourth limiting section comprises a fifth stop plate and a sixth stop plate, the fifth stop plate and the sixth stop plate are located on opposite positions on the mounting structure, one of the third stop plates and one of the fourth stop plates are orthogonally connected to form a first limiting slot, the other one of the third stop plates and the other one of the fourth stop plates are orthogonally connected to form a second limiting slot, and the connecting section plugs into a position between the first limiting slot and the second limiting slot.

16. A downlight fixture, comprising:

a light source board, arranged to emit optical light;

a metallic cup shaped heat sink, attached with the light source board;

a plastic housing, attached with the metallic cup shaped heat sink; and a straight-cutting wire, arranged to penetrate the plastic housing and the metallic cup shaped heat sink to electrically connect with the light source board, for providing power to the light source board, wherein a top plate jack is formed on a top plate of the plastic housing, a cup shaped heat sink jack is formed on the metallic cup shaped heat sink, a plug terminal is formed on the light source board, and the straight-cutting wire connects with the plug terminal by penetrating the top plate jack and the cup shaped heat sink jack.

17. The downlight fixture of claim 16, wherein the straight-cutting wire comprises:

a first straight section, arranged to receive the power;

a second straight section, plugged into the plug terminal of the light source board; and a bending section, connected between the first straight section and the second straight section;

wherein the bending section is arranged to induce an elastic force between the first straight section and the second straight section.

18. The downlight fixture of claim 17, wherein the straight-cutting wire further comprises:

a rigid cladding; and a conductive wire, disposed inside the rigid cladding;

wherein the plug terminal comprises a hollow connecting column arranged to receive the second straight section of the straight-cutting wire, an end section of the rigid cladding reaches an end section of the hollow connecting column, the conductive wire plugs into the hollow connecting column and connects with circuits of the light source board.

* * * * *